(12) United States Patent
Santos

(10) Patent No.: US 10,109,992 B2
(45) Date of Patent: Oct. 23, 2018

(54) METHODS FOR INSTALLING A RISER GLOVE ONTO CABLES EXTENDING FORM A RISER CONDUIT

(71) Applicant: Carlos M. Santos, Richmond Hill, GA (US)

(72) Inventor: Carlos M. Santos, Richmond Hill, GA (US)

(*) Notice: Subject to any disclaimer, the term of this patent is extended or adjusted under 35 U.S.C. 154(b) by 88 days.

(21) Appl. No.: 15/418,972

(22) Filed: Jan. 30, 2017

(65) Prior Publication Data

US 2017/0141556 A1 May 18, 2017

Related U.S. Application Data

(62) Division of application No. 14/546,575, filed on Nov. 18, 2014, now Pat. No. 9,601,910.

(60) Provisional application No. 61/905,696, filed on Nov. 18, 2013.

(51) Int. Cl.
*H01R 43/00* (2006.01)
*H02G 7/02* (2006.01)
*H02G 7/20* (2006.01)
*H02G 3/04* (2006.01)

(52) U.S. Cl.
CPC ............ *H02G 7/02* (2013.01); *H02G 3/0493* (2013.01); *H02G 7/205* (2013.01)

(58) Field of Classification Search
CPC ........ H02G 7/02; H02G 3/0493; H02G 7/205; G02B 6/4476; Y10T 29/49194; F16L 41/023
USPC .................... 29/868, 872; 174/72 R, 77 R
See application file for complete search history.

(56) References Cited

U.S. PATENT DOCUMENTS

| | | | |
|---|---|---|---|
| 3,465,092 A | 9/1969 | Schwartz | |
| 4,156,103 A | 5/1979 | Dola | |
| 4,625,073 A * | 11/1986 | Breesch | B29C 61/0608 174/72 R |
| 5,208,428 A * | 5/1993 | Foss | G02B 6/4476 174/77 R |
| 6,619,697 B2 * | 9/2003 | Griffioen | F16L 41/023 285/126.1 |
| 9,318,885 B2 | 4/2016 | Schumacher | |
| 2007/0044809 A1 | 3/2007 | Flynn | |

* cited by examiner

*Primary Examiner* — Donghai D Nguyen
(74) *Attorney, Agent, or Firm* — Nixon & Vanderhye P.C.

(57) ABSTRACT

A riser glove for shielding and/or sealing cables extending from a riser conduit includes a wrist portion sized for a sealing fit over the riser conduit, and a plurality of finger portions extending from the wrist portion. The finger portions taper from a widest section adjacent the wrist portion to a narrowest section at distal ends thereof. The finger portions include incremental indicators along lengths thereof corresponding to different cable gauges, respectively.

15 Claims, 7 Drawing Sheets

METHODS FOR INSTALLING A RISER GLOVE ONTO CABLES EXTENDING FORM A RISER CONDUIT

CROSS-REFERENCES TO RELATED APPLICATIONS

This application is a divisional of U.S. patent application Ser. No. 14/546,575, filed Nov. 18, 2014, now U.S. Pat. No. 9,601,910, which claims the benefit of U.S. Provisional Patent Application Ser. No. 61/905,696, filed Nov. 18, 2013, the entire contents of each of which are hereby incorporated by reference in this application.

STATEMENT REGARDING FEDERALLY SPONSORED RESEARCH OR DEVELOPMENT (Not Applicable)

BACKGROUND OF THE INVENTION

A riser is typically used to shield cables extending to and from junction boxes or directly up from the ground to one or more target locations. The use of an upright riser, for example, is to transition cable(s) from underground to overhead construction and is commonly found mounted to a utility pole for running a cable up from the ground to a point of connection that may reside higher up along the utility pole. See FIG. 1.

Presently, the transition space at the riser opening where the cables extend out from an open end of a riser is either unsealed and fully exposed to the entry of external elements (e.g., debris, weather, wildlife, foreign objects, etc.), or is sealed to some extent by the use of a sealing compound such as a putty or foam applied to the open end of the riser around the protruding cables. These existing solutions, however, fail to provide an effective and manageable approach to sealing the riser opening from external elements and from preventing external elements, particularly rain water, from entering the riser. Rain water, for example, may collect in the vertical underground sections, thereby submerging those cables under water. The water may also flow into the building and into contact with electrical components such as metering devices, panel boards, and distribution centers, thereby causing corrosion, short-circuiting and damage to those components. An effectively sealed opening will also deter entry into the riser by small rodents, thereby shielding the cable from chewing damage.

Common problems that arise, for example, with current sealing methods are that they do not provide a solution for accommodating a plurality of cables of varying gauges extending out from a single riser. Additionally, sealing compounds tend to break down over time and can be difficult to remove, which can be particularly limiting when the need arises to add new cables or make repairs to existing cables in the riser.

It would thus be desirable to provide an improved solution for shielding and sealing around cables extending out from an open end of a riser, including services of multiple size cables in a common conduit, while providing a protective barrier from the elements downstream of the open end of the riser. One application of the invention would be to use one at the pole and one at each electrical or communication cable entry point to the enclosure or equipment in the building at every utility service to the customer's premises.

BRIEF SUMMARY OF THE INVENTION

A riser glove according to preferred embodiments provides a means for sealing and protecting the transition space between a riser conduit and the cables extending from the riser conduit. The riser glove includes tapering finger portions for engaging an open end of a riser conduit with one or more cables (e.g., electrical wiring) of various gauges. Cables extending out of the open end of the riser conduit are received into the multi-gauge finger portions, each of which may be selectively sized to accommodate varying cable gauges. The riser glove may be constructed of one or more elastic materials that allow for ease in installation, provide excellent dielectric properties and ensure cables embodied therein are shielded from exposure to adverse environmental elements.

In an exemplary embodiment, a riser glove for engaging a riser opening around cables extending from a riser conduit includes a wrist portion, and a plurality of finger portions extending from the wrist portion. The finger portions taper from a widest section adjacent the wrist portion to a narrowest section at distal ends thereof. The finger portions include incremental indicators along lengths thereof corresponding to different cable gauges, respectively. Preferably, the finger portions provide a sealing fit around each cable protrusion. The wrist portion may also provide a sealing fit over the riser conduit.

The wrist portion and the finger portions may be formed of an elastic material. The finger portions may be integral with the wrist portion. The finger portions may be cone shaped. In one arrangement, the incremental indicators define cutting areas for cutting the fingers such that the fingers have an opening specifically sized to accommodate corresponding cable gauges. The incremental indicators may include perforated lines. The wrist portion and the finger portions may be configurable for electric service between 600V-35 kV. The incremental indicators may define openings for the fingers corresponding to fiber optic cable outside diameters. The wrist portion may include a bushing engageable with the riser conduit. In this context, the bushing may include threads for a threaded engagement with the riser conduit. The finger portions may each comprise a drain member. In this context, each of the drain members may be connected to a respective one of the finger portions at the widest section.

In another exemplary embodiment, a method of installing a riser glove onto cables extending from a riser conduit includes the steps of (a) identifying a gauge of a cable extending from the riser conduit; (b) cutting one of the finger portions at the incremental indicator corresponding to the gauge identified in step (a); (c) threading the cable through the one of the finger portions; and (d) fitting the wrist portion over the riser conduit. Steps (a) and (b) may be practiced for each of the cables extending from the riser conduit. Step (d) may be practiced before step (c). In this context, step (d) may be practiced by threading the wrist portion over the riser conduit.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
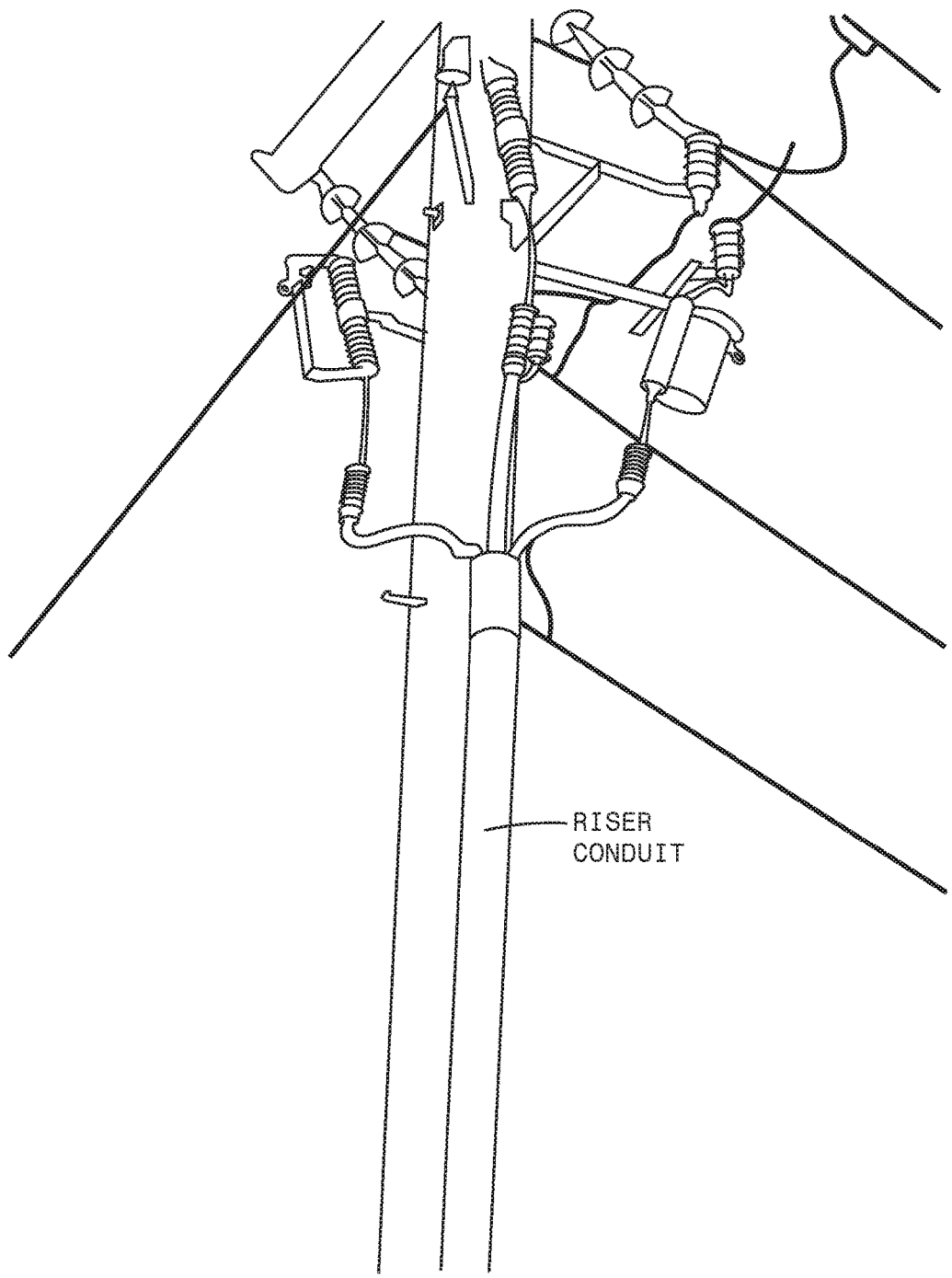
FIG. 1 shows an exemplary power line with cables extending from a riser conduit.
Figure 2:
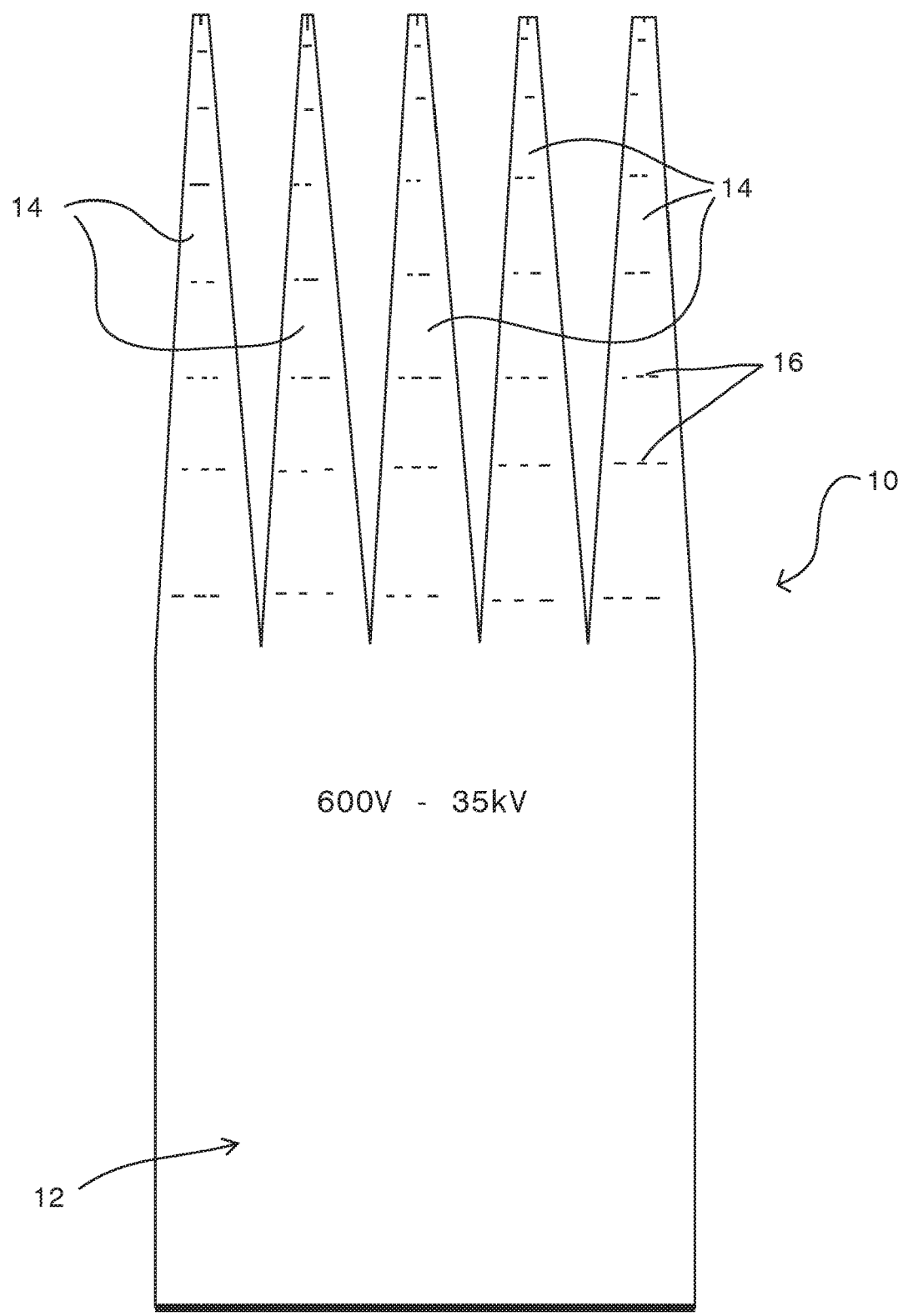
FIG. 2 is an exemplary configuration of the riser glove according to preferred embodiments.

FIG. 2 shows an exemplary riser glove 10 according to preferred embodiments. The riser glove 10 includes a full-diameter opening or a wrist portion 12 at one end that is sized for a sealing fit over the riser conduit. In an exemplary construction, the overall diameter of the wrist portion 12 will range from approximately 1"-6", sufficient for the wrist portion 12 to fit over and tightly seal against various size riser conduits typical to the electrical utility trade in use as risers.

The riser glove 10 also includes a plurality of finger portions 14 extending from the wrist portion 12. As shown, the finger portions 14 taper from a widest section adjacent the wrist portion 12 to a narrowest section at distal ends thereof. Preferably, the finger portions 14 are cone-shaped. The finger portions 14 may be integral with the wrist portion 12. The finger portions 14 include incremental indicators 16 along lengths thereof corresponding to different cable gauges, respectively. That is, the incremental indicators 16 serve as incremental markers at the diameter of the finger portion 14 that is appropriate for various cable or wire gauges, indicating that by cutting at the corresponding increment 16, an opening can be created of an appropriate diameter to tightly seal against a cable of a particular gauge. Uncut finger portions 14 (i.e., unused finger portions) are preferably sealed and available for future use or to house an empty or spare inner duct stub that might exist in the conduit without a cable therein.

An exemplary modification to the product may include a single protrusion for one master cable, with the conduit end diameter ranging from the typical 1"-6" conduit sizes and the cable end single protrusion diameter ranging from 6" at the base of its cone to 1" at the tip, marked for cutting in 1" increments.

Sizes identified on the wire gauge scale may be, for example, provided in American Wire Gauge (AWG) and million circular mils (MCM) units of measurement. The incremental indicators 16 may be perforated marks provided along the outer periphery surface of the finger portions 14 to guide preparation of the riser glove 10 for accommodating cables of varying gauge sizes that extend out from the open end of the riser conduit. For purposes of illustration, and not by way of limitation, the wire gauge scale on the finger portions 14 ranges in size from 1 AWG to 350 MCM; however, the finger portions 14 may be constructed to accommodate a larger or smaller range of wire gauge sizes.

The wrist portion 12 and the finger portions 14 may be constructed of one or more elastomeric compounds such as EPDM, silicone, or any other suitable rubber-like compound providing desired characteristics. For example, the use of EPDM may be preferred in the construction of the riser glove in that it exhibits excellent weather resistant and electrical insulating properties.

In one embodiment, the wrist portion 12 and the finger portions 14 may be constructed of the same elastomeric compound. In another embodiment, the wrist portion 12 and the finger portions 14 may be constructed of different elastomeric compounds. In yet another embodiment, the wrist portion 12 and finger portions 14 may each be constructed of the same elastomeric compound, but have different durometer values (i.e., measures of hardness) to provide varying levels of rigidity and flexibility in the two portions.

The riser glove 10 is adaptable for various conduit and cable size combinations specific to a 600V electric service, however the design is the same and adaptable for voltages up to 35 kV nominal with their corresponding conduit and cable size, and also for communication cables where it would be marked accordingly to typical fiber optic cable outside diameters. The riser glove 10 is suited for both riser applications (referring to transitions where the cable continues beyond the riser conduit emerging from underground) and service entrances (transitions where overhead cables enter a conduit such as when attached to a building and leading to an electric meter).

Figure 3:
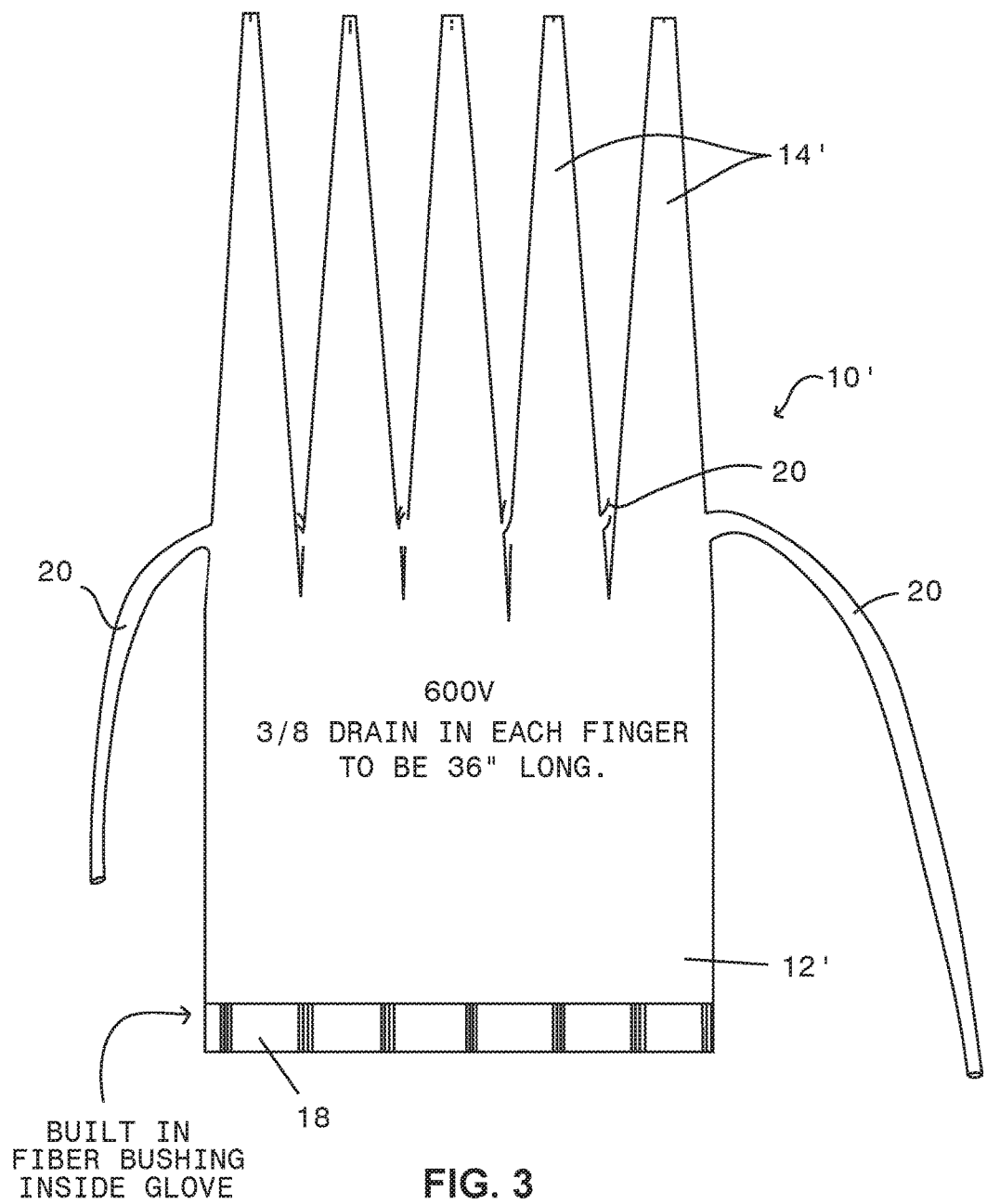
FIG. 3 is an exemplary illustration of an enclosure glove.
Figure 4:
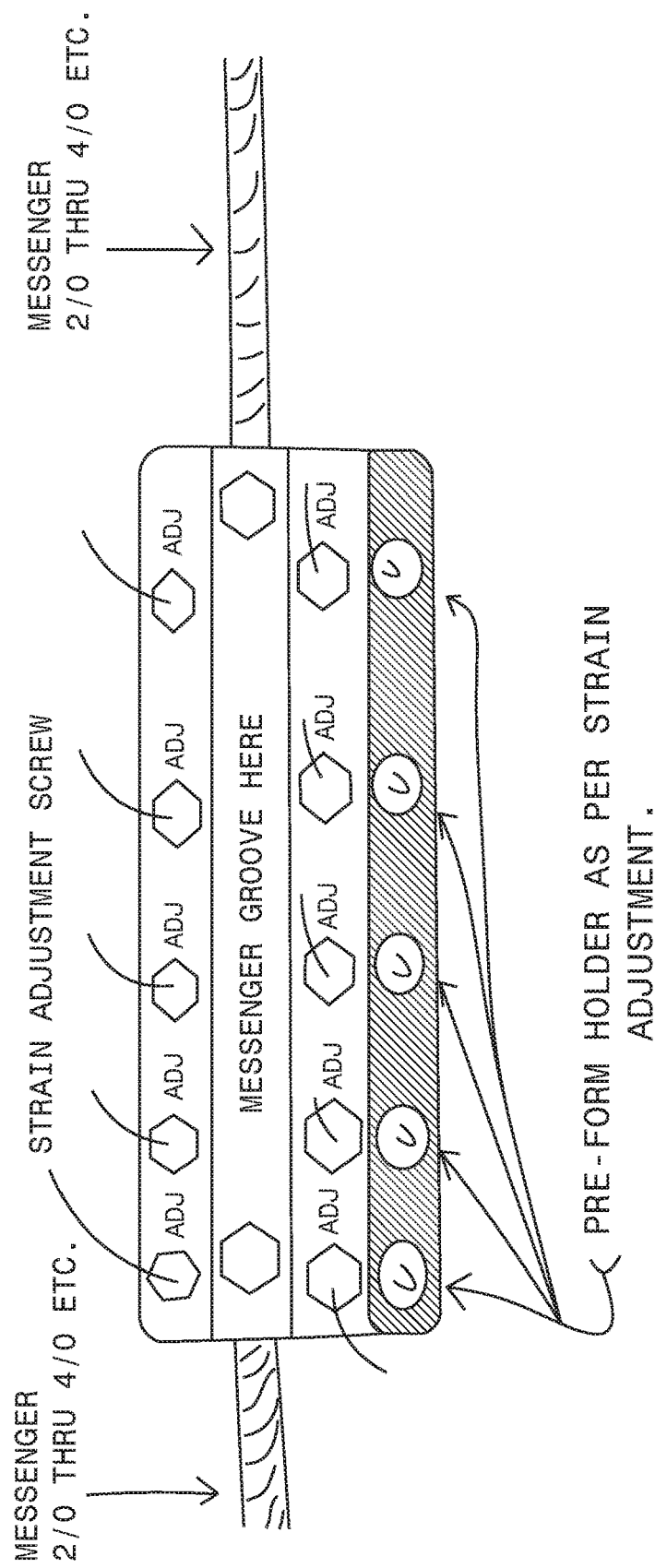
FIGS. 4-7 show strain releasing connectors.
Figure 5:
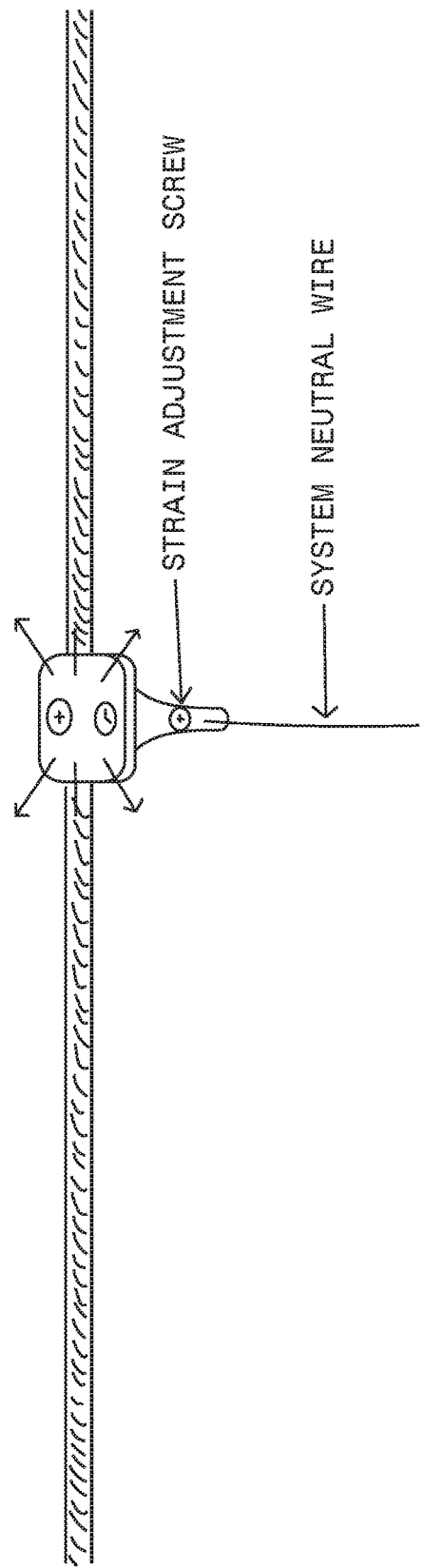
Figure 6:
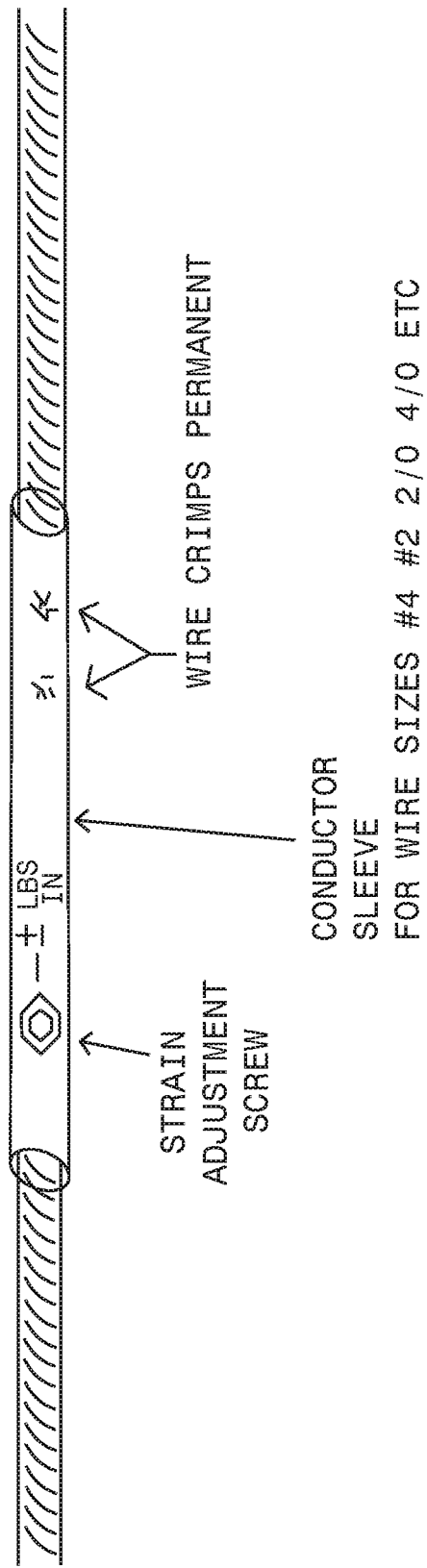
Figure 7:
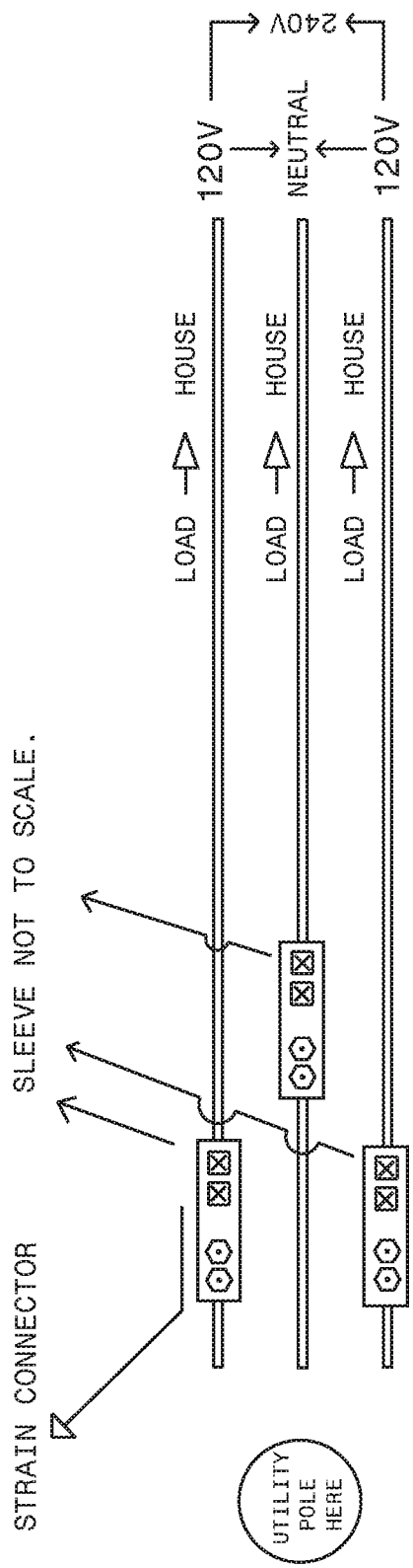

FIG. 3 shows an alternative embodiment for use within an enclosure such as where the transition of cables extending beyond the conduit occurs inside a current transformer or junction box. In FIG. 3, the modified glove 10' similarly includes a wrist portion 12' and finger portions 14'. A built-in bushing 18 is provided inside the wrist portion end to thread onto a conduit watertight fitting. In an alternative construction, if the conduit is threaded into the enclosure, the glove bushing can be directly installed onto the conduit and sealed without having to go onto a separate watertight fitting as the glove would perform this function. Alternatively, the enclosure glove can be provided without its own built-in bushing. Each finger portion 14' may be provided with a drain member 20 for diverting accumulated water that can enter the riser from other environmental entry points along the riser. In one construction, each of the drain members 20 is connected to a respective one of the finger portions 14' at the widest section of the finger portions 14' as shown. A suitable size for the drain members 20 is a ⅜" drain about 36" long. The length should be sufficient to exit the enclosure to the outside environment for discharge. The drain members 20 can also be used as "grounding conduits" to permit a grounding wire to be routed to an electrical cabinet.

With reference to FIGS. 4-7, a mechanical connector/separator is shown to bridge two pieces of cable/messenger together. Each conductor has its own strain adjustment screw to be released so that the messenger/cable can be released accordingly to prevent damage. This basic design is appropriate to all cables/messenger types and sizes commonly utilized by the electric utility industry. Three examples are illustrated: (1) a secondary distribution release block for use with messenger cable sizes 2/0 through 4/0 with connection points for pre-forms (see FIG. 4), (2) on a single neutral/grounding cable with a tie connection point for the system neutral wire (see FIG. 5), and (3) as an in-line sleeve for a single conductor cable such as up to 600 volts for secondary distribution and services as well as any conductor cable carrying more than 600 volts such as for primary distribution and services, including the neutral/messenger cables for each system configuration (see FIGS. 6 and 7). The in-line sleeve is appropriate to be utilized with every energized conductor so that all wires can release under excessive strain and come down together. The products would be sized appropriate to all typical cable/messenger diameters, and with or without tie-in provisions for wire connections or hardware typical to that application.

Ultimately, the goal on these devices is to have each cable's conductors disconnect or come apart at this strain relief point when excessive strain such as from a storm or car-pole accident, etc., is placed on this cable, thereby avoiding damaging the building attachment hardware and also preventing the utility pole from snapping, pulling down energized utility lines. These connectors should be installed on the utility distribution grid end of the service wires, or as close as possible thereto, so that when the load side of the strain connector will let go of the cable, this same cable will then come down to the ground de-energized while also avoiding or minimizing damage to the building attachment. This safe release will also allow the source (utility power) side of the cable to remain energized and working by keeping it intact; isolated from the fault. These connectors are appropriate to be installed at every service location; whether primary or secondary voltage and for every customer type: industrial, commercial or residential, etc. These devices improve public safety, utility reliability and preserve property on both sides of the connector.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of installing a riser glove onto cables extending from a riser conduit, the riser glove including a wrist portion sized to fit over the riser conduit, and a plurality of finger portions extending from the wrist portion, the finger portions tapering from a widest section adjacent the wrist portion to a narrowest section at distal ends thereof, wherein the finger portions comprise incremental indicators along lengths thereof corresponding to different cable gauges, respectively, the method comprising:
   (a) identifying a gauge of a cable extending from the riser conduit;
   (b) cutting one of the finger portions at the incremental indicator corresponding to the gauge identified in step (a);
   (c) threading the cable through the one of the finger portions; and
   (d) fitting the wrist portion over the riser conduit.

2. A method according to claim 1, wherein steps (a) and (b) are practiced for each of the cables extending from the riser conduit.

3. A method according to claim 1, wherein step (d) is practiced before step (c).

4. A method according to claim 3, wherein step (d) is practiced by threading the wrist portion over the riser conduit.

5. A method according to claim 1, wherein the finger portions are formed of an elastic material, and wherein step (c) is practiced to provide a seal against the cable.

6. A method according to claim 1, wherein the incremental indicators comprise perforated lines, and wherein step (b) is practiced by cutting the one of the finger portions along a respective one of the perforated lines.

7. A method according to claim 1, wherein step (b) is practiced before step (c).

8. A method according to claim 1, wherein the finger portions each comprise a drain member, and wherein step (c) is practiced by positioning the drain members to discharge any fluid accumulation to outside of the finger portions.

9. A method according to claim 8, further comprising routing a grounding wire through one of the drain members to an electrical cabinet.

10. A method of installing a riser glove onto cables extending from a riser conduit, the riser glove including a wrist portion sized to fit over the riser conduit, and a plurality of finger portions extending from the wrist portion, the finger portions tapering from a widest section adjacent the wrist portion to a narrowest section at distal ends thereof, wherein the finger portions comprise incremental indicators along lengths thereof corresponding to different cable gauges, respectively, the method comprising:
   (a) identifying gauges of respective cables extending from the riser conduit;
   (b) cutting a number of the finger portions corresponding to the respective cables at respective ones of the incremental indicators matching the gauges identified in step (a), wherein step (b) is practiced such that the fingers have openings specifically sized to accommodate the gauges of the respective cables;
   (c) threading the cables through the finger portions; and
   (d) fitting the wrist portion over the riser conduit.

11. A method according to claim 10, wherein step (d) is practiced before step (c).

12. A method according to claim 11, wherein step (d) is practiced by threading the wrist portion over the riser conduit.

13. A method according to claim 10, wherein the finger portions are formed of an elastic material, and wherein step (c) is practiced to provide a seal against the cable.

14. A method according to claim 10, wherein the incremental indicators comprise perforated lines, and wherein step (b) is practiced by cutting the finger portions along respective ones of the perforated lines.

15. A method according to claim 10, wherein step (b) is practiced before step (c).

* * * * *